May 31, 1966 A. KANICS 3,253,865
APPARATUS FOR HANDLING BULK MATERIAL
Filed March 11, 1965 2 Sheets-Sheet 1
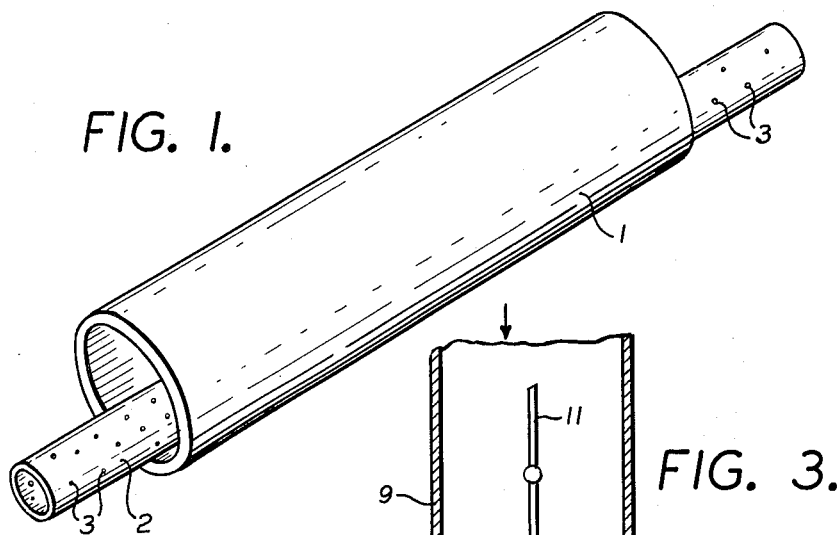
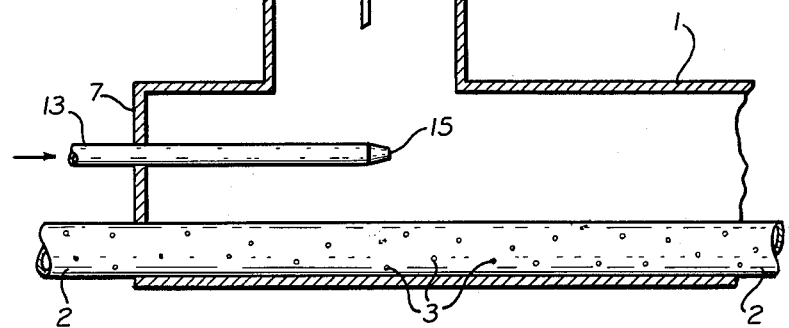
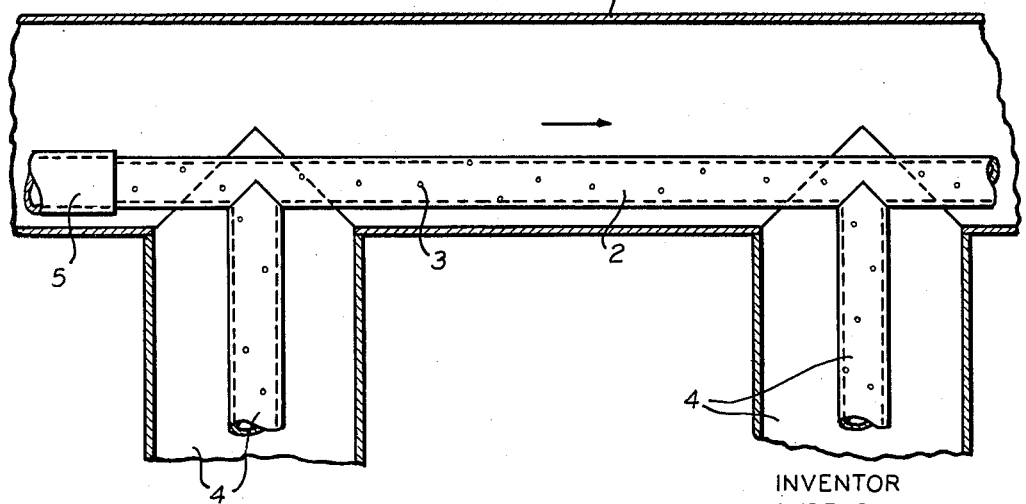
INVENTOR
ANDRAS KANICS
BY
ATTORNEY.

May 31, 1966  A. KANICS  3,253,865
APPARATUS FOR HANDLING BULK MATERIAL
Filed March 11, 1965  2 Sheets-Sheet 2
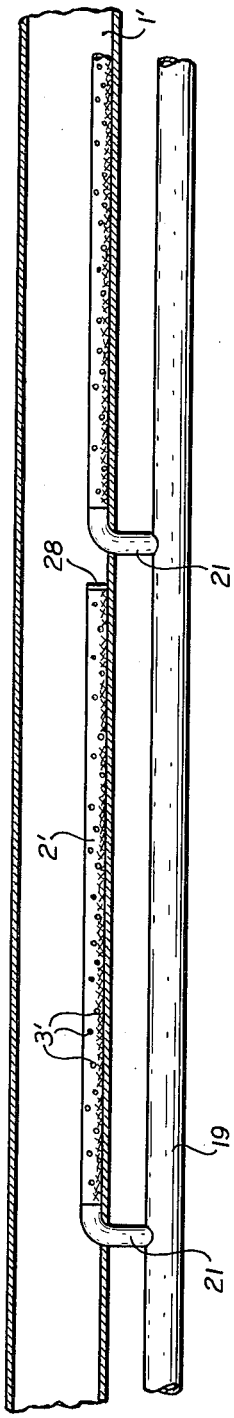
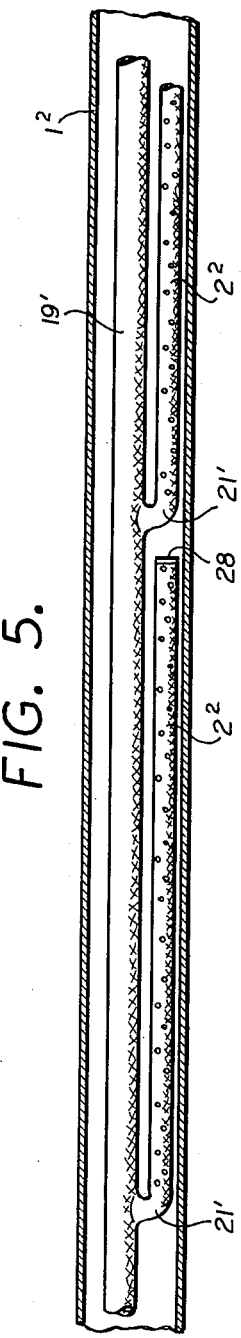
INVENTOR
ANDRAS KANICS
BY
ATTORNEY.

United States Patent Office 3,253,865
Patented May 31, 1966

3,253,865
APPARATUS FOR HANDLING BULK MATERIAL
Andras Kanics, Hohenstaufenstr. 14,
Frankfurt am Main, Germany
Filed Mar. 11, 1965, Ser. No. 439,035
9 Claims. (Cl. 302—29)

This is a continuation-in-part application of the copending application, Serial No. 271,681, filed April 9, 1963 (now abandoned).

The present invention relates to a pneumatic conveyor pipe line for conveying bulk material, having a first duct passed by the bulk material in longitudinal direction (bulk material duct) and a second duct for the supply of compressed gas (gas duct), said second duct extending in parallel relationship to said first duct.

There are already known in the art such conveyor pipe lines wherein the bulk material duct and an air duct extend adjacent to each other throughout their length. The partition wall between the two ducts is formed by a bottom of sintered metal or a fabric layer. These prior art embodiments, however, are disadvantageous in so far as the conveying air will penetrate through the porous partition wall into the bulk material duct substantially at the charging end only of the conveyor pipe line, whereas no air will penetrate anymore through the partition wall in the more remote portions of the conveyor pipe line, the pipe line thus tending to be blocked in these portions. Therefore, these prior art conveyor pipe lines were not adapted to bridge considerable conveying distances.

It is one object of the present invention to provide a pneumatic conveyor pipe line for bulk material wherein passageways or openings connecting the gas duct to the bulk material duct are distributed throughout the length of the conveyor pipe line. Since such connecting passageways or openings are provided at a restricted number of locations only along the conveyor pipe line, compressed gas may be passed therethrough from the gas duct over a considerable length. Moreover, there exists the possibility of providing an additional supply to the gas duct at predetermined locations of the pipe line by individual pressure sources, so as to provide at any part a pressure sufficient for supplying air to the bulk material duct.

It is another object of the present invention to provide a pneumatic conveyor pipe line for bulk material wherein the bulk material duct comprises a hermetic tubular shell and the gas duct a pipe arranged outside of the tubular shell. In this way a simplified form of a conveyor pipe line can be built which for a certain type of bulk material leads to excellent conveying results.

The gas duct can be arranged within or without the tubular shell. If it is arranged within the tubular shell, then preferably the connecting openings are openings in the wall of the gas duct. Accordingly it is only necessary to insert a pipe or hose constituting the gas duct in the tubular shell. The hose is preferably made of an elastical plastic material.

It is still another object of the present invention to provide a pneumatic conveyor pipe line for bulk material wherein the bulk material duct and the gas duct are extending in parallel relationship to each other. According to the above mentioned prior art conveyor pipe lines porous flexible tubes among others were laid within bulk material ducts, particularly within conveying troughs. In such conveyor pipe lines, conveyance is possible only at a predetermined minimum fall of about seven percent. In this case the gas mainly serves for lifting the material from the bottom of the bulk material duct to a certain level, from where it falls back to the bottom, but offset by a distance in the conveying direction as compared to the position occupied prior to said lifting process. The movement of the material in the conveying direction is somewhat enhanced by the gas flowing through the bulk material duct, but to a small extent only. The material is thus permanently conveyed in fluidized form.

This manner of conveying involves the disadvantage that conveyance is possible in downward direction only. This results in a considerable difference of levels, if extended distances of conveyance are required, which differences in level must be surmounted by additional means such as elevators. In addition, only readily fluidizable material is adapted to be conveyed. There are, however, existing some types of material which are not adapted to be conveyed in spite of their good fluidizability, e.g. crystal sugar.

It is yet another object of the present invention to provide a pneumatic conveyor pipe line for bulk material which resides in a quite different method of conveying, to wit, in the form of individual subsequent pistons.

This is obtained by providing elastically self-closing openings for the passage of gas along the length of the gas duct, said openings connecting the gas duct to the bulk material duct.

The operation of such embodiment is distinct from that of the prior art conveyor pipe lines for the following reasons. If material is present on a porous partition wall between the gas duct and the bulk material duct, gas may enter through the permanently opened pores of the partition wall between the particles of the material. The material is therefore permanently fluidized at all locations of the pipe line. If, however, the gas passage openings are elastically self-closing, according to this embodiment of the present invention, the gas preferably escapes at those locations where no material is present on the partition wall between the gas duct and the bulk material duct.

It is known to use a coating having elastically self-closing passage openings for an annular tube that lies on the bottom of a container. This arrangement, however, has the purpose only of fluidizing the material on the bottom of the container. Subsequently the material is conveyed in the previously known manner through a pipe. This arrangement by no means renders obvious the use of elastically self-closing passage openings in the partition wall between the bulk material duct and the gas duct for the purpose of conveying the material in piston form.

In all known pneumatic conveyor assemblies it was the main condition that the material is moved in a gas stream in fluidized form. The pipe line was not allowed to be filled up by material all over its cross-section at any part. Contrary thereto, it is taught by the last mentioned embodiment of the present invention to fill up the bulk material duct at individual locations within its whole length throughout its whole cross-section by the mentioned pistons of material. Thus, conveyance is effected with a practically permanently blocked pipe line. This results in the following advantages:

The conveyance may be interrupted and taken up again, with the filled pipe line, at any desired moment.

The conveying rate may consequently be as low as desired. The material, the pipe line and the elbow parts thereof are thus protected.

The rate of conveying is controllable.

The conveyance may be interrupted from the extraction station. This provides the possibility of portioning at the extraction station.

It is possible to construct conveyor pipe lines in a length of several miles.

The pipe line may extend not only horizontally but also about vertically and may contain elbow parts bent at any desired angle, even at a right angle. The pipe line may extend so as to form so-called sacks, i.e. portions which extend downwards and subsequently upwards.

Any desired number of branches may be provided at the pipe line, even without the previously required pipe switches.

Apart from granular and powdery material, also sticky, hygroscopic, approximately pasty and electrostatically charged material may be conveyed.

Considerable savings of energy result.

If a tube serving as gas duct is inserted into a hermetic tubular shell, so that the bulk material duct is formed by the space therebetween, the elastically self-closing gas passage openings may be formed by the elasticity of the tube wall, according to a further embodiment of the present invention.

Thus a very economical manner of producing a conveyor pipe line is obtained. The tube needs merely be loosely inserted into the tubular shell.

If it is desired to bridge considerable conveying distances, it is advantageous not to use a single continuous flexible gas tube, since this would cause the danger of an insufficient gas supply to the bulk material duct at the end of such flexible tube.

It is, therefore, still another object of the present invention, to provide a pneumatic conveyor pipe line for bulk material wherein to each connecting passageway, such a flexible gas tube is connected within the bulk material duct, the tube having a closed free end in the neighborhood of the next following connecting passageway. It is then possible to provide flexible gas tubes of such a length that they supply at their rearward end not materially less conveying gas than at their forward end.

Although the following description refers to "air" as conveying gas, it is to be understood that under certain circumstances other gases than air can be used, especially when a contact between oxygen or other constituents of the air with the bulk material is to be avoided.

With these and other objects in view, which will become apparent in the following detailed description, the present invention will be clearly understood in connection with the accompanying drawings, in which FIGURE 1 shows a piece of tubular shell with the gas or air tube inserted therein;

FIG. 2 is a sectional view of a piece of a tubular shell with the air tube inserted and having branches;

FIG. 3 is a vertical section of the charging end of the conveyor pipe line; and

FIGS. 4 and 5 are longitudinal sections of conveyor pipe lines with connecting passageways to which flexible tubes are connected, the latter being disposed inside and outside, respectively, of the conveyor pipe lines.

Referring now to the drawings, and in particular to FIGS. 1–3, embodiments of the present invention are disclosed which comprise a rigid tubular shell or conveyor pipe 1 with a flexible air tube 2 inserted therein. The space between the flexible tube 2 and the conveyor pipe 1 serves as bulk material duct. The air duct surrounded by the walls of the flexible tube is thus connected to the bulk material duct throughout its length. The flexible tube 2 has elastic walls consisting preferably of synthetic material. Pierced into the walls of the flexible air tube are air passage openings 3 which are elastically self-closing due to the elasticity of the tube wall. Finer openings may be obtained by radio frequency sparks, and finest openings by means of an ion accelerator.

The tube 2 may be secured within the tubular shell 1 by any conventional means (not shown). A particularly economical pipe line, however, is obtained if the tube 2 is loosely inserted into the tubular shell 1.

Referring now to FIG. 2, the tubular shell 1 and the tube 2 may have branches 4 which may be mounted at any desired angle, thus even at right angles.

For large conveying distances it is convenient to form the air supply tube with reductions in cross-section, as shown at 5 in FIG. 2. Such reductions in cross-section are particularly suitable for an extended length of the flexible tube 2, because in this case, the air stream will be substantially stronger at the forward end of such tube, than at the rearward end thereof.

Referring now to FIG. 3, the conveyor pipe line is closed at its charging, i.e. entrance end by a wall 7, and has a pipe socket 9 for receiving the bulk material, said pipe socket 9 being capable of being closed by a pivoted flap 11. The air tube 2 and an air pipe 13 terminating in an injector nozzle 15 are extending through the wall 7.

In the construction of a conveyor pipe line, tubular shell pieces are joined to form long distances. Afterwards, the air tube is inserted into these joined tubular shells.

Particular good results are obtained, if the air passage openings 3 are arranged irregularly, and in particular in both, the longitudinal direction of the tube 2 and in the peripheral direction thereof. Depending upon the diameter of the tube 2, the diameter of the openings 3 and the number thereof per unit length are suitable varied. Both should increase with increasing diameter of the air tube 2.

The operation of the disclosed conveyor pipe line is performed in the following manner:

The elastic air openings of the tube 2 will enlarge only if the pressure within the tube 2 exceeds that within the bulk material duct by an amount required for overcoming the elasticity of the tube wall. The openings will automatically close in case of lower pressure conditions. Thus they cannot be blocked.

As indicated in FIG. 3 of the drawings, the material to be conveyed is fed through the pipe socket 9 into the bulk material duct 1. Primary air is supplied through the air pipe 13 which primary air emerges from the nozzle 15. Contrary to the previously known conveyor pipe lines, however, the air supplied through the nozzle 15 is of such a small amount only, that the material is moved together to form individual pistons having lengths of from about 1 to 7 ft., according to the type of the goods and to the pipe line diameter. The pistons are occupying the whole cross-sectional area of the bulk material duct 1 and practically block the latter, so that it is not possible to convey by means of the air supplied through the air pipe 13 and the nozzle 15 only. The presence of the air tube 2 brings about the movement of the pistons. This occurs in the form of a fluctuating movement. Each of the pistons thus periodically varies its velocity of movement.

If a filled conveyor pipe line is re-started, air will escape from the tube 2 through the openings 3 throughout the length of the pipe line 1 only up to that moment, where the pressure within the bulk material duct will be approximately the same as in the tube 2. Thereafter the air can escape from the bulk material duct into the atmosphere only at the rear end of the pipe line. Therefore, the pistons in this region will start moving due to the increasing, accumulated pressure. Subsequently, further pistons located nearer to the charging end of the pipe line are moved and conveyed off, until, finally, the entire material in the pipe line will be moving.

If it is desired to convey by means of elastic inner tubes, it is advantageous, particularly for extended conveying distances, to connect individual tube pieces 2' to the inner ends of passageways 21 (FIG. 4) which provide a communication between the tube pieces 2' and an air feeding conduct 19, disposed outside of the conveyor pipe 1'. Each tube piece 2' has elastically self-closing air passage openings 3' and consists of an elastic wall and a closed free end 28 in the neighborhood of the next passageway 21. By this means conveying air is supplied substantially uniformly over the full length of the conveyor pipe line.

The embodiment disclosed in FIG. 5 is of a design similar to that of FIG. 4 and comprises an air supply hose 19' which is disposed within the conveyor pipe 1. The hose 19' can be made of the same elastic material as the tube pieces 2² which are secured to the hose 19' as branches by means of passageways 21'. Thus an air supply hose 19' with the branches 2² can be drawn as a single unit into the conveyor pipe 1², when assembling the line.

In FIGS. 4 and 5 the width is greatly exaggerated, for the sake of clearness, as compared with the length of the lines. Thus the distances between the connecting passageways 21 and 21', respectively, are of the order of about 50 to 130 feet.

While I have disclosed several embodiments of the present invention, it is to be understood that these embodiments are given by example only and not in a limiting sense, the scope of the present invention being determined by the objects and the claims.

I claim:

1. A pneumatic pipe line for bulk material, comprising a bulk material duct,
a gas supplying duct of flexible material disposed parallel to said bulk material duct,
said gas supplying duct having a plurality of connecting openings disposed spaced apart from each other throughout the length of said gas supplying duct and said connecting openings being self-closing and self-opening to provide communication between said ducts upon increasing the pressure in said gas supplying duct,
said bulk material duct having a feeding end and a discharge end,
and an air pipe leading at the feeding end into said bulk material duct,
whereby individual pistons are produced of said bulk material at said feeding end and are conveyed separate from each other throughout the length of said bulk material duct.

2. The pipe line, as set forth in claim 1, wherein said bulk material duct comprises a hermetic tubular shell confining said flexible duct,
and said bulk material duct being provided by the space outside of said flexible duct.

3. The pipe line, as set forth in claim 2, wherein said connecting openings of said flexible duct are disposed in the peripheral direction in an irregularly offset manner.

4. The pipe line, as set forth in claim 2, wherein said connecting openings of said flexible duct are spaced irregularly in the longitudinal direction of said duct.

5. The pipe line, as set forth in claim 2, wherein said flexible duct has at least one portion of reduced cross section in the conveying direction.

6. The pipe line, as set forth in claim 2, wherein said flexible tube is subdivided into sections along the axial length of said pipe line,
a gas feeding opening being provided at the upstream end of said sections,
the downstream ends of said sections being closed,
a gas feeding conduit being disposed parallel to said sections,
and passageways connecting said gas feeding conduit with said upstream ends of said sections.

7. The pipe line, as set forth in claim 6, wherein said passageways are spaced apart from each other throughout the axial length of said bulk material duct for about 50 to 130 feet.

8. The pipe line, as set forth in claim 6, wherein said gas feeding conduit is disposed outside of said tubular shell.

9. The pipe line, as set forth in claim 6, wherein said gas feeding conduit is disposed inside of said tubular shell.

References Cited by the Examiner

UNITED STATES PATENTS

| | | | |
|---|---|---|---|
| 1,759,983 | 5/1930 | Houston | 302—29 |
| 1,792,286 | 2/1931 | Curry | 302—29 |
| 1,971,853 | 8/1934 | Ihlefeldt | 302—29 |
| 2,919,159 | 12/1959 | Lacroix | 302—53 |

FOREIGN PATENTS 863,921   1/1953   Germany.

HUGO O. SCHULZ, *Primary Examiner.*

ANDRES H. NIELSEN, *Examiner.*